United States Patent [19]

Chang et al.

[11] 4,179,059

[45] Dec. 18, 1979

[54] AUTOMATIC PIPE WELDING APPARATUS AND METHOD

[75] Inventors: Nuke M. Chang, Santa Anna, Calif.; John O. Emmerson, West Granby; Donald Ritchie, Ellington, both of Conn.; William Hollenbeck, Montrose, Calif.

[73] Assignee: Santa Fe International Corporation, Orange, Calif.

[21] Appl. No.: 785,219

[22] Filed: Apr. 6, 1977

[51] Int. Cl.² .................. B23K 9/12; B23K 9/16; B23K 9/02

[52] U.S. Cl. .................. 228/103; 219/60 A; 219/105; 219/75; 219/125.11; 228/11; 228/42; 228/50; 228/168; 228/219

[58] Field of Search .................. 228/9, 11, 29, 41, 42, 228/44.5, 50, 102, 103, 168, 169, 218, 219; 219/60 R, 60 A, 105, 124, 125 R, 75, 72, 74, 125.11

[56] References Cited

U.S. PATENT DOCUMENTS

| | | | |
|---|---|---|---|
| 2,350,716 | 6/1944 | Bissout et al. | 219/60 A X |
| 2,894,111 | 7/1959 | McNutt | 219/60 A X |
| 3,069,529 | 12/1962 | Gotch | 219/125.11 X |
| 3,216,641 | 11/1965 | Brems | 228/9 X |
| 3,461,264 | 8/1969 | Nelson et al. | 228/44.5 X |
| 3,570,109 | 3/1971 | Harlan et al. | 228/50 X |
| 3,935,420 | 1/1976 | Sandstrom | 219/125 R |
| 4,040,557 | 8/1977 | Heverly | 228/9 |

FOREIGN PATENT DOCUMENTS

1427329 2/1976 United Kingdom .................. 219/60 A

Primary Examiner—Francis S. Husar
Assistant Examiner—Kenneth J. Ramsey
Attorney, Agent, or Firm—LeBlanc and Shur

[57] ABSTRACT

A TIG pipe welding method which employs two sets of machine guide surfaces on the pipe ends. First radially inner guide surfaces cooperate with a sensor coupled to the welding torch to continuously monitor the arc gap between the welding electrode and the weld puddle as the welding electrode moves around the circumference of the pipe. The second set of radially outer surfaces cooperate with a welding carriage to guide the carriage and welding modules around the pipe joint. The carriage is constructed to provide a sealed welding chamber surrounding the electrode. An additional flow of shielding gas is provided around the torch electrode of a TIG or hot wire TIG welding module to augment the normal gas shield. The augmented shield provides a gas flow in opposition to pressurized air flowing through the welding chamber to prevent exposure of the weld nugget to the pressurized air flow being maintained in the welding chamber while permitting the pressure forces to be transmitted through this shield to the weld nugget, creating a "puddle pushing" effect. The transfer of forces through the gas shield, while preventing contaminating air from entering the weld zone itself, provides a positive force for pushing the molten weld puddle through the joint to the interior surfaces of the joined pipe ends. The pressurized air further flows outwardly between the seals of the welding carriage and the pipe surfaces to create an air cushion between the pipes and the carriage. An internal weld backup and pipe alignment ring is also provided.

52 Claims, 8 Drawing Figures

AUTOMATIC PIPE WELDING APPARATUS AND METHOD

BACKGROUND OF THE INVENTION

The present invention relates to automatic pipe welding systems and more particularly to systems for welding pipe lengths end-to-end as part of a continuous pipe laying sytem.

The present invention is particularly suited for both onshore and marine pipe laying operations wherein sections of pipe must be welded end-to-end and where the pipe remains stationary and the welding mechanism rotates around the pipe ends.

The concept of welding circumferentially around stationary pipes using a rotating welding apparatus has been known in the art for some time. Examples of such prior art systems are disclosed in U.S. Pat. No. 2,960,597 issued Nov. 15, 1960 to Bruno, et al. and U.S. Pat. No. 3,084,244 issued Apr. 2, 1963 to Rieppel, et al., which are among some of the earlier patents disclosing such rotatable welding apparatus and U.S. Pat. No. 3,753,525 issued Aug. 21, 1973 to Homes and U.S. Pat. No. 3,840,170 issued Oct. 8, 1974 to Arikawa, et al., among the more recent patents dealing with this subject.

Heretofore, known pipe welding systems have been plagued by such difficulties as undue complexity, thereby increasing their operating and maintenance costs, inability to track properly, and inability to successfully weld pipe ends in accordance with American Petroleum Institute (API) standards.

The present invention is designed to overcome difficulties associated with prior art automatic welding systems. In this invention, the pipe ends are first prepared prior to welding to provide highly accurage guide surfaces. Secondly, a welding torch carriage arrangement is provided which engages the exterior surfaces of the abutting pipe ends to be welded, which carriage is guided around the circumference of the pipe ends in conjunction with the guide surfaces provided thereon. Thirdly, a back-up band arrangement is provided interiorly of the joint to be welded. These features combine in the present invention to produce a satisfactory weld joint during a single continuous pass of the welding apparatus around the pipe ends.

In its first aspect, the invention provides machined pipe ends having two sets of guide surfaces. A first radially inner guide surface cooperates with a sensor coupled to the welding torch to continuously monitor the arc gap between the welding electrode and the weld puddle. This provides a distinct advantage over previous welding operations in which the unstable weld puddle itself was used as a reference surface. In such previous systems, the appearance of a hole in the weld puddle would usually result in the torch electrode being driven into the weld joint, causing contamination of the weld and/or damage to the electrode. By using a machined surface on the prepared pipe end as a reference, the electrode to weld puddle distance can be continuously and accurately controlled as the electrode moves around the circumference of the pipe joint.

End preparation may be accomplished by clamping a pipe end with reference to the central longitudinal axis. In accord with the system described in U.S. Pat. No. 3,888,103, issued June 10, 1975 to Renshaw, the pipe end is rounded by the clamping action of multiple radial jacks exerting high forces on the pipe interior, e.g., 12 jacks exerting 30 tons each for a 36 inch pipe. Next, the cutting head of a conventional machining apparatus cuts the clamped and rounded pipe end on a plane perpendicular to the longitudinal axis within close tolerances; the cutting head will also cut the inside diameter of the annular end section (13 or 15 in FIG. 3) to a fixed inside diameter within desired tolerances.

After "end prep" of the ends of the two pipe sections for welding have been completed, the two pipe sections are clamped for welding. This may be done in the following way: one pipe end is attached to a pipe string and therefore non-rotatable; a first clamp head is clamped by multiple radial jacks to the inside of the pipe beyond the end prepped section (i.e., to the left beyond numeral 17 in FIG. 3). Simultaneously, with such clamping, the central clamp is positioned axially of the pipes so that the central clamp is midway of the pipe end. At this step, the third set of jacks is clamped into the end of the pipe section to be welded onto the pipe string, with the two prepared ends spaced about one inch apart and the pipes being concentric with each other so that the two end prepped sections (13 and 15 in FIG. 3) are concentric and "matching". Then the third clamp in the pipe section is hydraulically displaced to abut the pipe ends with suitable compressive force, e.g., about 30 tons for a 36 inch pipe. Then the jacks of the middle head are displaced radially outward from a common head an equal distance to apply an equal force at circumferentially spaced portions of the two abutting pipe ends, thereby clamping same concentric with the longitudinal axis of the abutting pipe sections. The weld-back-up ring is then expanded into circumferential engagement with the abutting prepared ends of the pipe sections, as will be described in more detail below.

This feature of "end-prepping" the pipe sections to be joined assures a true circular abutment and accurate alignment of the pipe sections for welding. This substantially eliminates bore mismatch, speeds production and improves weld quality in the pipeline.

A second aspect of the invention resides in the use of a new and improved type of welding apparatus and method. Typical tungsten inert gas via TIG or hot wire TIG, welding methods employ a tungsten electrode around which is fed a supply of inert gas to form a gas shield around the weld area to prevent oxidation of the weld nugget. In this invention, an additional flow of shielding gas may be provided around the torch electrode to augment the normal gas shield. The augmented shield provides a gas flow in opposition to pressurized air flowing through the welding chamber. This prevents exposure of the weld nugget to the pressurized air flow being maintained in the welding chamber while permitting the pressure forces to be transmitted through this shield to the weld nugget, creating a "puddle pushing" effect. The transfer of forces through the gas shield, while preventing contaminating air from entering the weld zone itself, provides a positive force for pushing the molten weld puddle through the joint to the interior surfaces of the jointed pipe ends. The use of "puddle pushing" on the root pass results in a weld bead being formed on the interior surface of the pipe; puddle pushing is not used on subsequent passes. By employing a positive force to push the weld puddle through the pipe interior in a controlled manner, a good weld can be formed around the pipe irrespective of the torch orientation; e.g., the effect of the gravitational forces on the flow of the molten weld material is reduced so as to minimize any differences between the weld bead at the top and bottom of the pipe. This allows the use of two or more (depending on pipe size) torch apparatuses to simultaneously weld circumferential sections of the pipe so as to complete a 360° weld in one pass, thereby achieving a substantially uniform weld around the entire pipe.

A pressurized flow of air through the welding chamber may be used to enhance the puddle pushing effect and to facilitate movement of the welding carriage around the pipe joint. The carriage is constructed to provide flexible seal members which cooperate with the exterior surfaces of the pipes to define the welding chamber. The pressurized air in the welding chamber may flow outwardly between the seal members and pipe surfaces to create an air cushion effect between the welding carriage and the pipes. The use of this pressurized air in the welding chamber is desired but may cause difficulties if not properly used and controlled because it allows air flow in the chamber which may disturb the gas zones.

The third major aspect of the invention resides in the particular back-up band which provides a mold on the interior of the joint into which the weld puddle is flowed. This invention employs an expandable band, which may be made of any appropriate material, but preferably is copper. The back-up band is carried on a set of rounding jacks which engage the facing pipe ends and exert a circumferentially uniform radial force on the pipes. This serves to round the ends equally and bring them into coaxial alignment with each other in the vicinity of the joint. The back-up band bridges the joint and expands to form a close fitting or semi-sealed chamber around the joint. Thus, a mold is provided on the interior face of the joint, into which the weld puddle can flow.

It follows, therefore, that one object of this invention is to provide a new and improved automatic welding method and apparatus for welding stationary pipes.

A further object of the invention is to provide a system for welding from the outside the inner land of a weld joint in a single root pass.

A further object of the invention is to provide a welding apparatus that is easily mountable on the pipe ends in alignment with the joint to be welded.

A further object of the invention is to provide a means for accurately and continuously controlling the arc gap length as the welding apparatus makes a circumferential traverse of the pipe joint.

A further object of the invention is to provide a means to positively force weld material through the joint to weld the inner surface of the joint irrespective of the torch orientation.

These and further objects and advantages of the present invention will be more apparent upon reference to the following specification, appended claims and drawings.

DESCRIPTION OF THE PREFERRED EMBODIMENT

There are three major aspects to pipe welding utilizing the method and apparatus of the present invention. The first major aspect is end-prepping the pipe sections to be welded to provide the end of each pipe section with a bevel having the configuration to be described in more detail hereinbelow, such that a weld joint may be formed which has features useful in cooperation with other aspects of the invention.

The second major aspect of the invention is aligning, rounding, and joining up the pipe sections to be welded, such that concentricity of the pipe sections and uniformity of the weld joint are ensured, and such that a back-up ring for the weld joint which is useful in combination with certain features of the welding method and apparatus is provided as an integral feature of the rounding apparatus.

The third major aspect of the invention is the actual welding together of the pipe sections with the apparatus and in the manner to be described in more detail hereinbelow.

Figure 1:
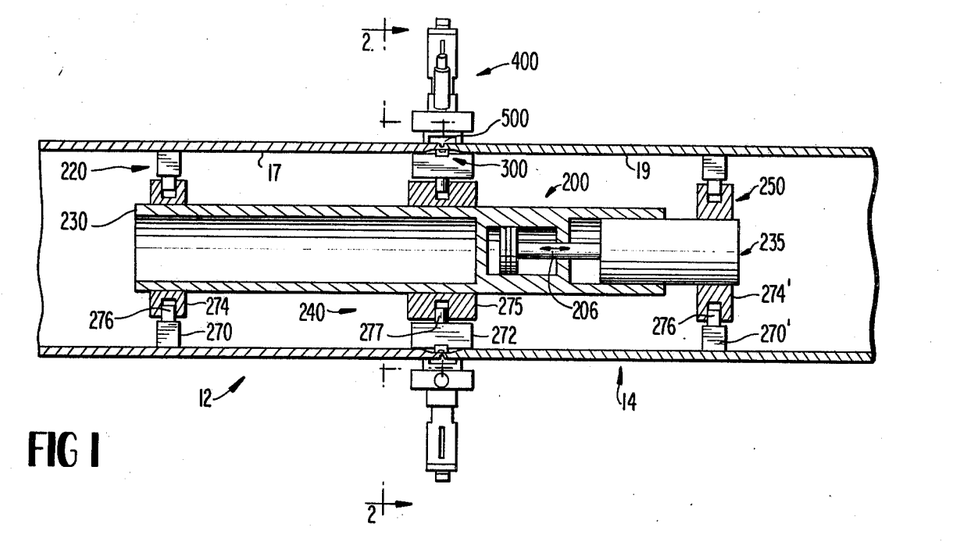
FIG. 1 is a side elevational section showing the prepared pipe ends, welding carriage, and inner back-up band arrangement of the invention.
Figure 2:
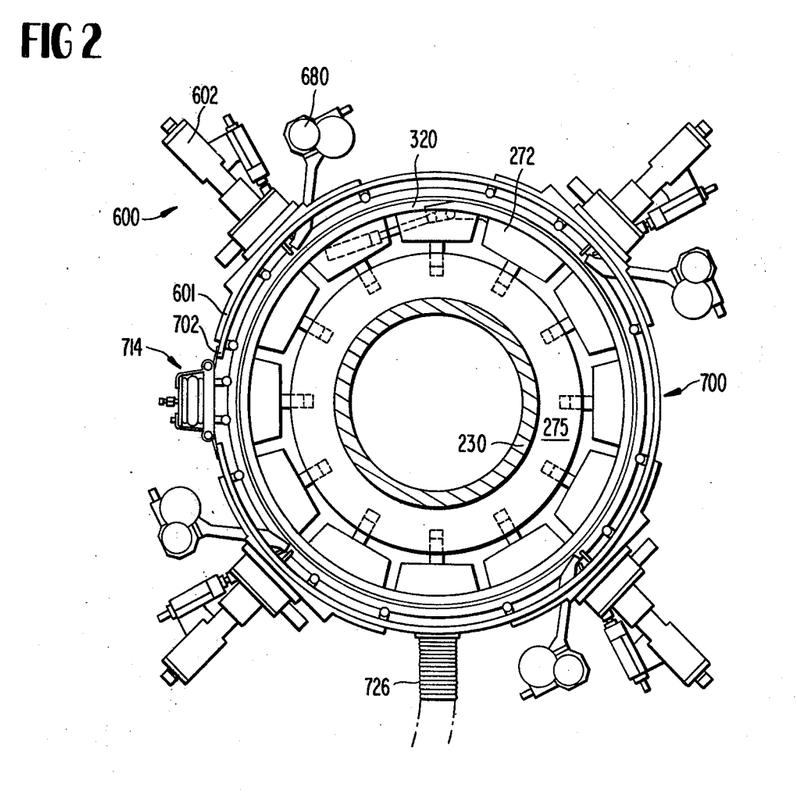
FIG. 2 is a cross-sectional view taken along line 2—2 in FIG. 1.

Referring to FIGS. 1 and 2, a pipe welding system constructed in accordance with the present invention is shown disposed in operative relationship with respect to first and second pipe sections 12 and 14, respectively, which are to be welded together in end-to-end abutting relationship. The pipe welding system generally comprises an internally disposed clamping assembly 200 for aligning, rounding and joining-up pipe sections 12 and 14, a back-up band assembly 300 for providing an internally disposed expansion chamber into which weld material is displaced to form a reinforcing weld, as will be described in more detail hereinbelow, and an externally disposed welding assembly 400 for automatic position welding of pipe sections 12 and 14. The ends of pipe sections 12 and 14 are prepared in accordance with a further aspect of the present invention before being placed in end-to-end relationship. When the pipe sections are thereafter placed in position to be welded together, the prepared facing ends define a weld joint 500 which is useful in cooperating with welding assembly 400.

A. End-Prep

Figure 3:
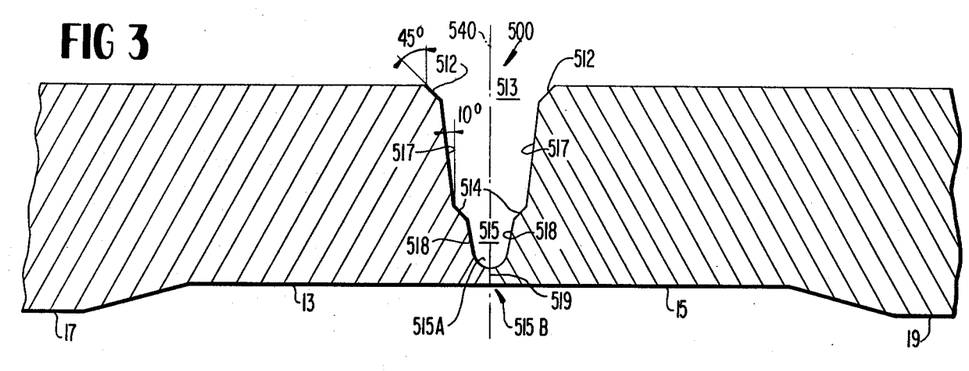
FIG. 3 is a detail of the prepared pipe ends.

Referring more specifically to FIG. 3 which shows a cross-section of a detail of the previously prepared pipe ends in facing relationship, the facing pipe section ends are bevelled such that joint 500 is symmetrical, being defined, in part, by two pairs of inclined surfaces, or lands, 512 and 514. Lands 512 are the uppermost surfaces of joint 500 and together define a circumferential guide or track 513 for welding assembly 400, as will be described in more detail hereinbelow. Lands 514 are intermediate, high quality machine surfaces located at a predetermined distance from the bottom 515 of joint 500, and together define a reference groove which is used by the welding assembly arc gap control apparatus to be described hereinbelow. Lands 512 and 514 preferably have a slope of 45° with respect to the vertical, as shown. Joint 500 is further defined by a pair of more steeply inclined surfaces 517, which connect the associated lands 512 and 514, and by a pair of partially curved surfaces 518 which together define the external face 515A of joint bottom 515, as shown, when pipe sections 12 and 14 are joined together. Joint bottom 515, including face 515A, defines the weld zone surface. Preferably, external face 515A of joint bottom 515 is spaced from an internal face 515B formed by interior recessed surfaces 13 and 15 of pipe sections 12 and 14 respectively. The upper portions of surfaces 518 are inclined similarly to surfaces 517, which preferably have a slope of 10° with respect to the vertical, as shown. Advantageously, the interior surfaces of pipe sections 12 and 14, are machined slightly to compensate for variations in the internal diameters of specific pipe sections 12 and 14, such that internal face 515B of joint bottom 515 is continuous and concentrically recessed with respect to the main interior surfaces 17 and 19 of pipe sections 12 and 14, respectively. Preferably a portion 519 of each pipe section end surface which connects faces 515A and 515B of joint bottom 515 extends radially with respect to the longitudinal axis of the corresponding pipe section, i.e., perpendicular to the wall of the pipe section.

Joint 500 also is generally dimensioned such that a minimum of weld material is required to fill the joint. For illustrative purposes only, and not by way of limitation, the dimensions of a joint 500 which has proved satisfactory for 36"×7/8" wall API 5LX pipe are as follows: with reference to a center line 540 extending radially from the longitudinal axis of the aligned pipes in the plane of face portions 519, the curved portions of surfaces 518 have a radius of curvature of approximately 0.060" with a center located on center line 540 between approximately 0.105" and 0.110" above the internal face 515B of joint bottom 515; the beginnings (i.e., radially innermost ends) of lands 514 are between approximately 0.075 and 0.080" axially away from center line 540. The beginnings of intermediate surfaces 517 are between approximately 0.120 and 0.125" axially away from center line 540; and the beginnings of lands 512 are approximately 0.165" axially away from the center line 540.

The pipe section ends may be milled, or end-prepped, by use of any conventional end-prepping device, such as, for example, devices available commercially from CRC-Crose International, Inc. of Houston, Texas.

B. Clamping and Back-band Assembly

The end-prepped pipe sections are positioned for welding by means of a clamping assembly 200. Again referring to FIGS. 1 and 2, clamping assembly 200 comprises a first sub-assembly which comprises an anchoring clamp 220 mounted on a support shaft 230 adjacent one end thereof, and a rounding clamp 240 mounted on shaft 230 so as to be spaced from clamp 220 by a predetermined distance. Clamping assembly 200 further comprises a second sub-assembly, which comprises a join-up clamp 250 mounted on a support shaft 235 which is connected to support shaft 230 by means of a hydraulic cylinder 260 such that clamp 250 may be displaced axially with respect to clamps 220 and 240, as indicated by the double-headed arrow 206.

Shafts 230 and 235 are longitudinally disposed within pipe sections 12 and 14, and clamps 220, 240, and 250 are transversely mounted on shafts 230 and 235, and thus are transversely disposed within pipe sections 12 and 14, as shown. Clamps 220 and 250 are generally similar, each comprising a plurality of radially disposed jack heads 270, 270′, respectively, which are circumferentially disposed about the perimeter of a block 274, 274′ housing the piston assemblies 276 for jack heads 270, 270′. Rounding clamp 240 comprises a plurality of jack heads 272 which are circumferentially disposed around the perimeter of a block 275, housing piston assemblies 277 for jack heads 272. Jack heads 272 are wide enough to span the gap between and engage interior surfaces 17 and 19 of pipe ends 12 and 14, respectively. Heads 272 contain back-up band assembly 300, as will be described in greater detail below. In all other important aspects except as may be noted below, heads 272 are similar to and operate in the same manner as heads 270, 270′.

Anchoring clamp 220 and join-up clamp 250 advantageously each has four jack heads 270, 270′, while rounding clamp 240 advantageously has twelve jack heads 272. Each clamp 220, 240, and 250 is independently controlled by conventional hydraulic actuator and control systems (not shown) which are programmed to cause the jack heads 270, 270′ and 272 for each clamp to expand radially outwardly in a uniform manner, such that the heads continuously define or maintain a precise circle, regardless of the load thereon. It is to be noted that conventional clamp systems, constructed consistent with the foregoing, may be used for clamping assembly 200.

In operation, clamping assembly 200 is positioned within pipe section 12, which typically constitutes the terminal section of a pipeline being constructed, such that rounding clamp 240 is disposed in relative alignment with the end of pipe section 12, i.e., the jack heads 272 of clamp 240 are centered with respect to surface 519 of the pipe end, such that jack heads 272 are disposed half within and half without pipe section 12. Clamp 220 is expanded such that the jack heads 270 thereof engage the interior wall 17 of pipe section 12 and clamping assembly 200 is thereby anchored within the pipe section. Hydraulic cylinder 260 is then actuated to displace clamp 250 away from clamps 220 and 240. Pipe section 14 is positioned relatively adjacent pipe section 12 such that the ends are in opposing relationship and clamp 250 is disposed within pipe section 14. Clamp 250 is then expanded such that the jack heads 270′ thereof engage the interior wall 19 of pipe section 14, and hydraulic cylinder 260 is again actuated to draw clamp 250 toward clamps 220 and 240 until pipe section 14 is in end-to-end abutting relationship with pipe section 12, as shown. It is to be noted that with clamps 220 and 250 so expanded, clamping assembly 220 and pipe sections 12 and 14 are brought into coaxial alignment with respect to each other. Finally, rounding clamp 240 is expanded to engage the interior walls 17 and 19 of pipe sections 12 and 14 until the pipe sections have been brought into round at least in the vicinity of weld joint 500. Clamping assembly 200 remains in the condition just described during the welding operation to be described hereinbelow. After welding has been completed, clamps 220, 240, and 250 are retracted and clamping assembly 200 is moved to the distal end of pipe section 14 where the clamping operation described hereinabove is repeated with respect to another pipe section which is to be joined to pipe section 14.

Figure 4A:
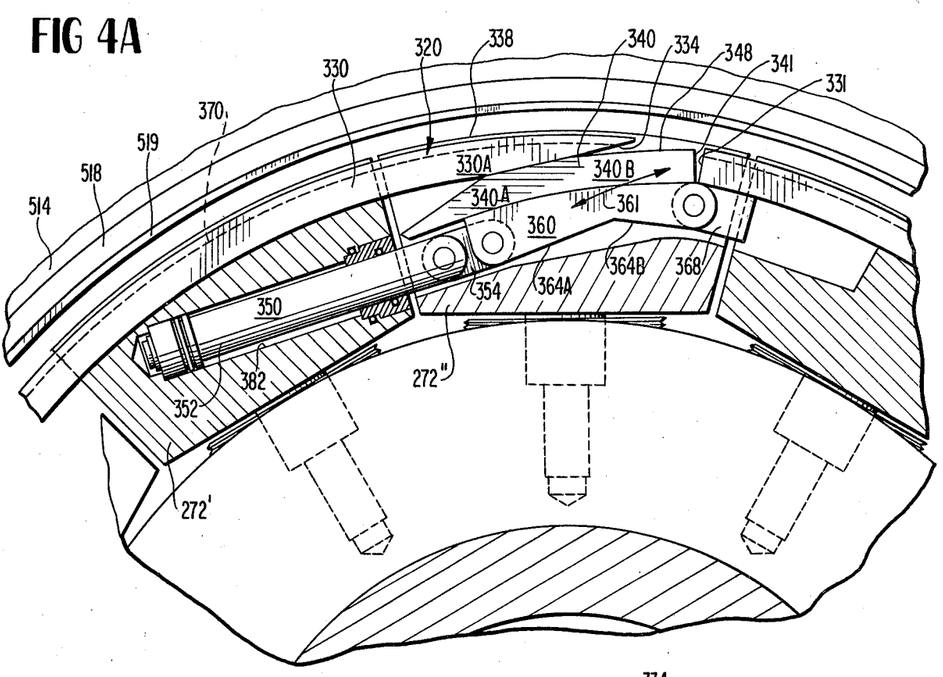
FIGS. 4A and 4B are cross-sections of a portion of the rounding clamp jacks and the back-up band in contracted and expanded positions, respectively.

Turning now to back-up band assembly 300, the structure and operation thereof will be described with particular reference to FIGS. 4A, 4B and 5. Back-up band assembly 300 comprises an expandable back-up ring or band, generally denoted 320, which advantageously is circumferentially disposed about the periphery of rounding clamp 240 within a recessed channel defined by a plurality of co-aligned recesses 280 in the outer, pipe-engaging faces 272A of rounding clamp jack heads 272. Advantageously, band 320 is centered with respect to jack heads 272, to facilitate alignment of band 320 with weld joint 500.

Back-up band 320 advantageously is articulated, comprising a main member 330 and a link member 340. Members 330 and 340 are pivotally or hingedly connected together in end-to-end relationship such that when back-up band 320 is in a first, unexpanded configuration, as shown in FIG. 4A, link member 340 is inclined relatively inwardly, or downwardly with respect to main member 330, with the distal end portion 330A of main member 330 partially overlaying link member 340, and such that when back-up band 320 is in a second, fully expanded pipe engaging configuration, as shown in FIG. 4B, link member 340 is disposed in relative alignment with main member 330.

The distal end portions 330A and 340A of main member 330 and link member 340, respectively, are both tapered in thickness, such that the lower face 334 of distal end portion 330A and the upper face 344 of distal end portion 340A have the same degree of inclination, as shown. The portion 340B comprising the remainder of the link member 340 has an upper face 348 which has the same degree of curvature as the upper face 338 of member 330. Portion 340B is dimensioned such that when link member 340 is disposed in relative alignment with main member 330, end 341 of link member 340 is flush with end 331 of main member 330, upper face 348 is aligned with upper face 338, and lower face 334 and upper face 344 of distal end portions 330A and 340A, respectively, are in abutting relationship, and a substantially continuous, unbroken surface defining the upper face of back-up band 320 is thereby formed.

Figure 4B:
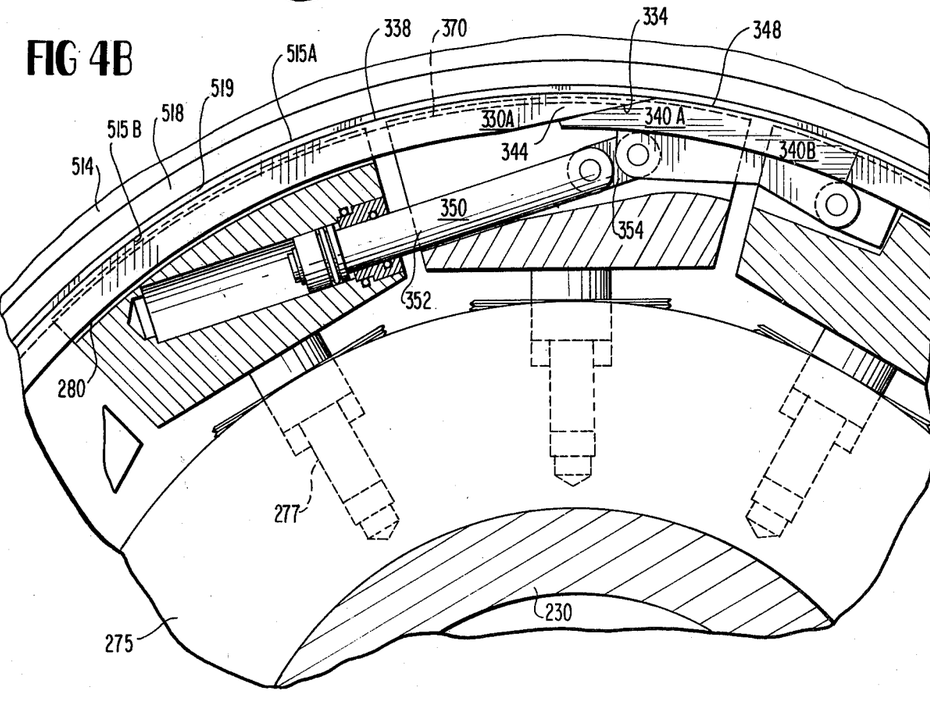
Figure 5:
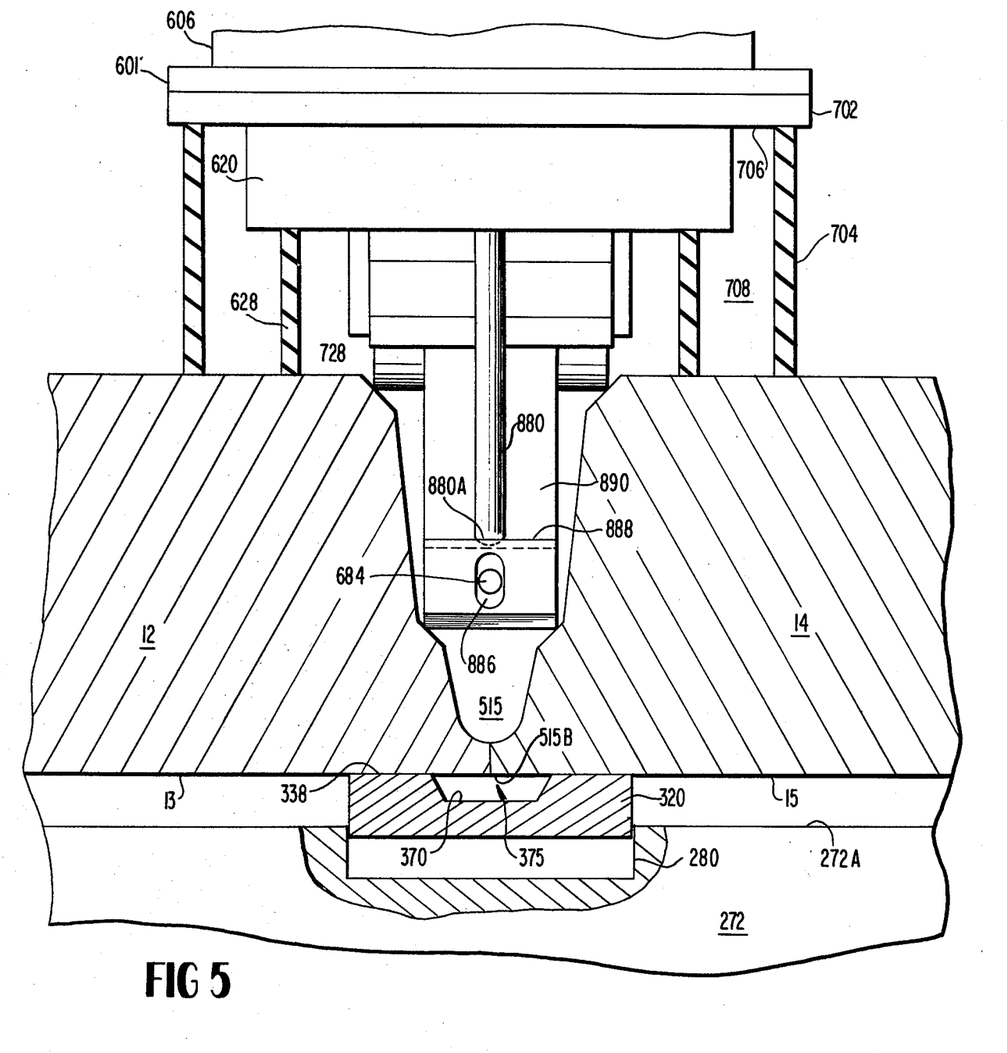
FIG. 5 is a detail of the weld zone, including the wire feed guide arm, prepared pipe end guide surfaces and back-up band arrangement.

Back-up band assembly 300 further comprises expansion means, generally denoted 350, which is coupled to back-up band link member 340 for expanding back-up band 320 independently of the expansion of clamp 240 from its relatively unexpanded configuration (FIG. 4A) to the fully-expanded, pipe-engaging configuration (FIG. 4B). Preferably, expansion means 350 comprises a hydraulic cylinder 352 disposed within a further recess 282 within the jack head 272' which is adjacent to the jack head 272" in which link member 340 is disposed, such that expansion of cylinder 352 causes both link member 340 and main member 330 to be displaced relatively circumferentially and outwardly, as indicated by the arrow 361 in FIG. 4A. Advantageously, hydraulic cylinder 352 is coupled to link member 340 by means of a coupling member 354 which is pivotably connected to both cylinder 352 and to link member 340, as shown, such that the outward displacement of link member 340 relative to main member 330 is facilitated, and link member 340 is cammed into relative alignment with main member 330 when back-up band 320 is in the fully expanded configuration. Link member 340 may also be provided with at least one downwardly-depending flange member 360, to which coupling member 354 is pivotably connected at one end thereof. As shown, the bottom edge of flange member 360 may advantageously comprise two substantially straight segments 364A and 364B, which are inclined at an obtuse angle with respect to each other. The opposite end of flange member 360 may also be pivotably mounted on a support member 368 depending from main member 330 and thereby hingedly connect link member 340 to main member 330.

The upper face 338 and 348 of main member 330 and link member 340, respectively, is each provided with a circumferential, trapezoidal-shaped, recess or groove 370 in coaxial alignment with each other, which together form a circumferentially extending expansion chamber 375 when back-up band 320 is in the fully-expanded pipe engaging configuration (FIGS. 4B, 5) into which molten weld material is displaced during the welding process, to be explained in more detail hereinbelow. Gas inlets (not shown) may also be provided in back-up band 320, such that expansion chamber 375 may be pressurized, if desired, with an inert gas to prevent oxidation of the weld nugget.

In operation, the centering of rounding clamp 240 within pipe section 12, as part of the clamping operation, results in back-up band 320 and expansion chamber 375 being centered with respect to weld join 500. Expansion of rounding clamp 240 causes a partial expansion of back-up band 320. After rounding clamp 240 has been fully expanded to round pipe sections 12 and 14, hydraulic cylinder 352 is actuated to complete expansion of back-up band 320 to the fully expanded configuration. It is to be noted that the width of band 320 may advantageously be dimensioned such that upper surface of band 320 engages internal faces 13 and 15 of pipe sections 12 and 14, respectively, to bridge the interior face 515B of weld joint 515, as shown. It is to be further noted that with back-up band 320 fully expanded, the forces exerted by cylinder 352 on link member 340 and main member 330 are such that every portion of back-up band 320 is under compression. Back-up band 320 remains fully expanded during the welding operation, to be described in more detail hereinbelow, and is retracted when the clamps of clamping assembly 200 are retracted.

C. Welding Assembly

Referring to FIGS. 1, 2, 6 and 7, the structure and operation of welding assembly 400 will now be described.

Welding assembly 400 comprises at least one, and preferably four, welding modules 600 for welding pipe sections 12 and 14 together along weld joint 500, a carriage assembly 700 on which welding modules 600 are mounted, for transporting modules 600 around weld joint 500, and a control system 800 for controlling the various variable parameters of the welding operation.

Preferably, carriage assembly 700 comprises an elongated carriage band 702 which is rotatably mounted around the joined-up pipe sections 12 and 14 in relative alignment with weld joint 500. Band 702 is provided with peripheral seal members 704, which, in cooperation with the lower, or pipe-facing surface 706 of band 702, define a pressurizable welding chamber 708 above joint 500. Preferably, seal members 704 may comprise flexible raised ribs or bumpers projecting from band surface 706 and extending along each edge of band 702 which function to establish air curtains, as will be described in more detail hereinbelow. Advantageously, band 702 may be made of a plastic material, such as nylon, and seal members 704 may be made of an elastomeric material, such as rubber.

Carriage assembly 700 also comprises at least one inlet in band 702 for introducing a pressurizing fluid from a source (not shown) through a flexible conduit 726 into welding chamber 708. Advantageously, the pressurizing fluid may be air. Also advantageously, seal members 704 do not form an air tight seal around welding chamber 708; rather, seal members 704 are sufficiently flexible to permit a flow of pressurizing fluid outwardly from welding chamber 708 and between seal members 704 and the opposing portions of the exterior surfaces of pipe sections 12 and 14. Seal members 704 function to establish air curtains, while chamber 708 remains presurrized. In addition, the passage of fluid between seal members 704 and the exterior pipe surfaces creates an air cushion effect to greatly reduce the friction therebetween and thus facilitate rotation of carriage assembly 700 about joint 500. Advantageously, air may be pumped into welding chamber 708 at a head of approximately 7½ to 8 inches of water pressure.

Preferably, the ends of band 702 are spaced from one another when band 702 is mounted on pipe sections 12 and 14. Carriage assembly 700 further comprises means, generally denoted 714, for tensioning band 702 snugly about the pipe sections 12 and 14. Tensioning means 714 preferably comprises a conventional bellows assembly 716 (such as manufactured, for example, by Firestone Company of Akron, Ohio) which is connected by means of flexible straps 718A and 718B to band 702. As is well known in the art, air-actuated, longitudinally expandable bellows assembly 716 has first and second plates 720A and 720B, respectively, mounted on the ends thereof. Carriage assembly 700, including band 702 and bellows assembly 716, is mounted on pipe sections 12 and 14 in relative alignment with joint 500, with plate 720 of the bellows assembly adjacent the exterior pipe surfaces and flexible straps 718A and 718B connected to plate 720B. Strap 718A may be releasably connected to plate 720B so as to facilitate mounting on and removal from pipe sections 12 and 14 of carriage assembly 700. It should be apparent from the foregoing that expansion of bellows 716 will cause band 702 to be drawn snugly about pipe sections 12 and 14. Bellows assembly plate 720 may be provided with a roller 722, as shown, to facilitate tensioning of band 702, and with guide wheels 724 mounted on the pipe facing surface thereof which cooperate with bands 512 to facilitate alignment of tensioning means 714 with, and rotation about, joint 500.

Carriage assembly 700 also comprises a plurality of spaced guide wheels 728 projecting from pipe facing surface 706 of carriage band 702 which also cooperate with bands 512 to align band 702 and the welding modules 600 mounted thereon with respect to joint 500 and to maintain the alignment while carriage assembly 700 is rotated about joint 500.

A conventional drive assembly may be employed for rotating carriage band 702 around joint 500. The drive assembly per se forms no part of this invention and need not be described in undue detail. It is sufficient to note that the drive assembly may advantageously comprise a tractor and a traction band on which the tractor rides, fixedly mounted around one of the pipe sections 12 or 14, adjacent to carriage band 702 and substantially parallel therewith. The tractor drive may be conventional, comprising a servo-controlled drive motor, feedback tachometer, and a notched belt drive arrangement. One such conventional drive assembly which may be used to drive the welding modules and carriage band circumferentially around the pipe joint is manufactured by S. A. Arcos Company of Brussels, Belgium and is described in the journal *Pipe Line Industry*, January, 1972, pp. 37-38. Rather than incorporating the welding module directly into the tractor drive, as in the Arcos arrangement, the tractor may be coupled to carriage band 702 by means of a yoke (not shown) which connects the tractor to one of the weld modules 600 such that the drive force is communicated to carriage band 702 at a point directly above the weld zone so as not to cause deformation of carriage bank 702 which might affect the desired welding torch electrode side clearance.

Welding modules 600 are identical and each comprises a torch module 602 and a wire feed module 680 mounted on a mounting plate 601 which is fixed to carriage band 702. Welding modules 600 are preferably mounted on band 702 such that torch modules 602 are equidistantly spaced from one another around joint 500. With four modules 600, modules 602 would be spaced approximately 90° apart.

Figure 7:
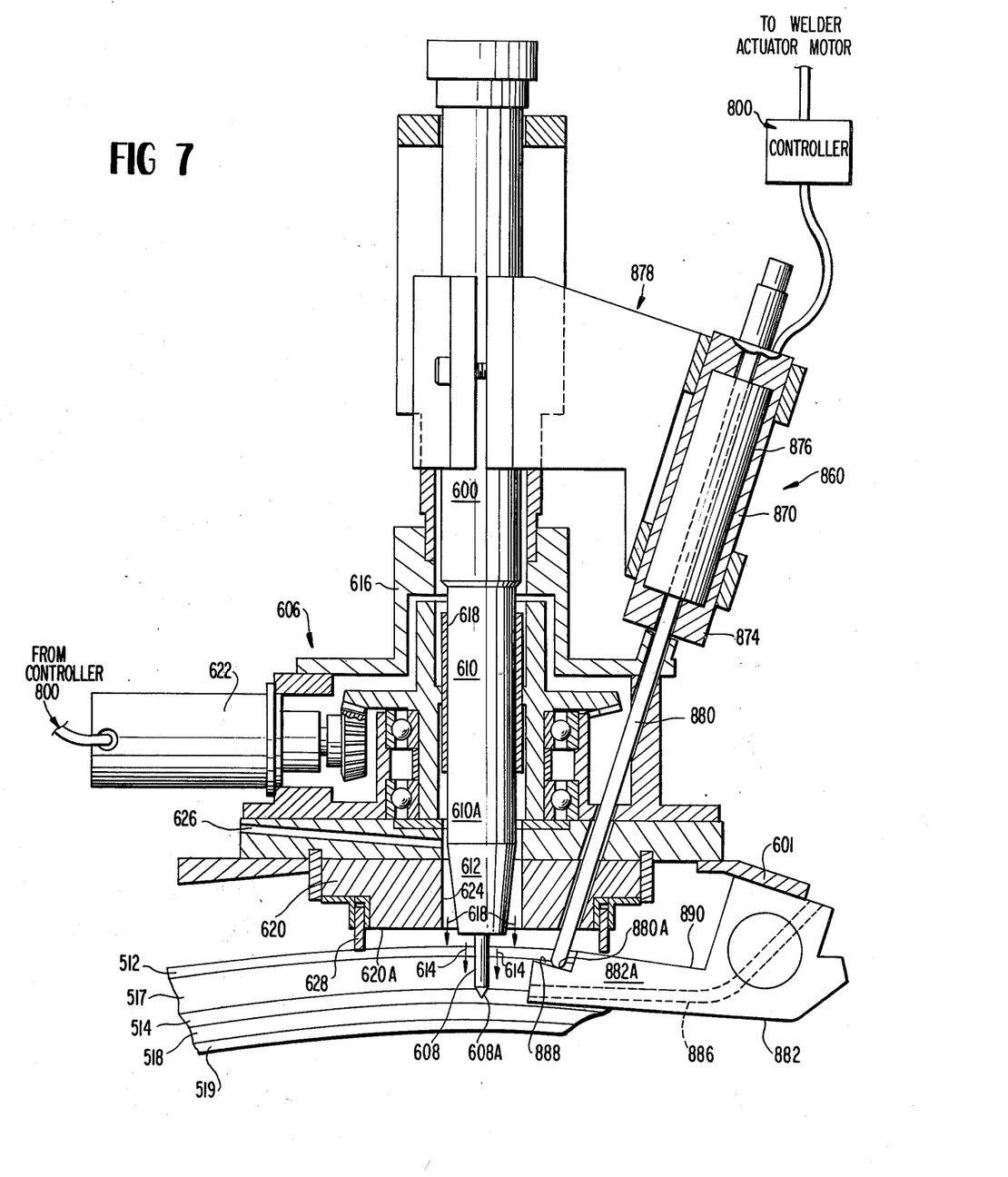
FIG. 7 is a part sectional view showing details of the welding torch and position sensor.

Referring particularly to FIG. 7, each torch module 602 comprises a conventional tungsten inert gas (TIG) torch 604 for heating the weld zone, and a servo-controlled linear actuator 606 for axially displacing torch 604 so as to adjust the arc gap length. Conventional means (not shown) are also provided to adjust the power, inert gas, and coolant water supplies associated with TIG torches. Torch 604 may advantageously comprise, for example, a Linde HW-27 water-cooled torch having a tungsten electrode 608 mounted within a jacket or sleeve 610 which provides a passage for coolant water and the inert gas used to form the gas shield around the weld area which is necessary with TIG welding, as is well known in the art. Sleeve 610 is constructed so as to function as a collet member, allowing sleeve 610 to be tightened about electrode 608. Torch 604 further comprises an annular ceramic gas cup or gas lens 612 mounted on end 610A of sleeve 610 such that electrode 608 is coaxially disposed within lens 612. Electrode 608 is mounted within sleeve 610 such that the tip 608A of electrode 608 extends a predetermined distance beyond the distal end of lens 612 when torch 604 is assembled. As is well known in the art, inert shielding gas is passed through the annular passageway defined between torch electrode 608 and gas lens 612 to form a gas shield around the weld area which prevents oxidation of the weld nugget. Gas lens 612 serves to eliminate turbulence in the inert gas stream as it emerges from the torch and causes the gas flow to be substantially parallel to electrode 608, as indicated by the arrows 614.

Actuator 606 is fixedly mounted to mounting plate 601 on carriage band 702 so as to be disposed over an orifice 703 provided in band 702 which allows access to welding chamber 708 and weld joint 500 by torch 604. Actuator 606 comprises a superstructure 616 which slidably receives a hollow sleeve 618 in which torch 604 is mounted, and a substructure 620 which extends through the orifice in band 702 into welding chamber 708. Actuator 606 is further provided with a conventional motorized screw drive assembly 622 mounted on superstructure 616 for axial displacement of sleeve 618 and thus of torch 604.

An annular passageway or port 624 may also be defined in actuator 606 which is coaxial with torch 604 and extends through substructure 620 to communicate with welding chamber 708. Inert gas from a source (not shown) is provided to port 624 through a passageway 626 in superstructure 616, such that an additional flow of shielding gas, indicated by the arrows denoted 618, is provided around torch electrode tip 608A which augments the gas shield provided by flow 614, and provides a gas flow in opposition to that of the pressurized air in the remainder of welding chamber 708. Advantageously, both flow 614 and flow 618 may be at the rate of 25 cu. ft./hr. However, all that is required is that the total flow be sufficient to prevent exposure of the weld nugget to the pressurized air flow being maintained in welding chamber 708. In addition, substructure 620 may be provided with an annular sponge or flexible ring or seal 628, as shown, which protrudes from the pipe-facing face 620A of substructure 620 and extends about the periphery thereof. When carriage assembly 600 is operatively mounted around the joined-up pipe sections 12 and 14, seal 628 is in contact with the outer surfaces of the pipe sections, and functions to establish a containment barrier or air curtain which serves to enhance the gas shield around torch electrode 608 and the effect of gas flow 618 is preventing mixing of the pressurized air within the remainder of welding chamber 708 with the gas shield in the vicinity of torch electrode 608. It is to be noted that with or without the provision of seal 628, the pressurized air within welding chamber 708, without contaminating the weld zone, causes a pressure to be exerted on the gas shield provided around torch electrode 608 during the welding operation, which pressure is transmitted by the gas shield to the weld puddle, causing a "puddle pushing" effect which tends to displace weld material into expansion chamber 375 in back-up band 320. A positive internal reinforcement of the weld bead, without oxidation thereof, is thereby provided as part of a single welding operation, which includes out-of-position welding. In addition, the possibility of the root bead possessing "internal concavity", as the term is defined in API Std. 1104, is minimized.

Each wire feed module 680 comprises a conventional servo-controlled wire feeder assembly 682, which delivers filler metal 684 to the weld area at a predetermined rate.

A conventional controller, generally denoted 800, may be employed for controlling those tasks which are common to all of the welding modules 600, as is well known in the art. The controller controls the welding parameters which directly affect the associated weld zone, including the weld current, electrode-to-weld (arc gap) distance, and rate of wire feed to the weld zone. Actual control of these welding parameters may be accomplished in a conventional manner by means of a set or "stack" of pre-shaped cams which vary potentiometers actuated by follower mechanisms connected to the corresponding cams. The potentiometer settings determine the electronic signals controlling the various servo devices, such as, for example, torch actuator 606. The profile for a cam is determined experimentally from trial and error weld tests conducted prior to commencement of the automatic welding. Each cam stack is advanced by means of a conventional, fixed speed, incremental-type drive servo that moves the cams in preset steps in response to rotation of carriage assembly 700 about weld joint 500. A conventional controller incorporating the fixtures described above is disclosed in U.S. Pat. No. 3,715,560, issued Feb. 6, 1973 to Emerson.

Figure 6:
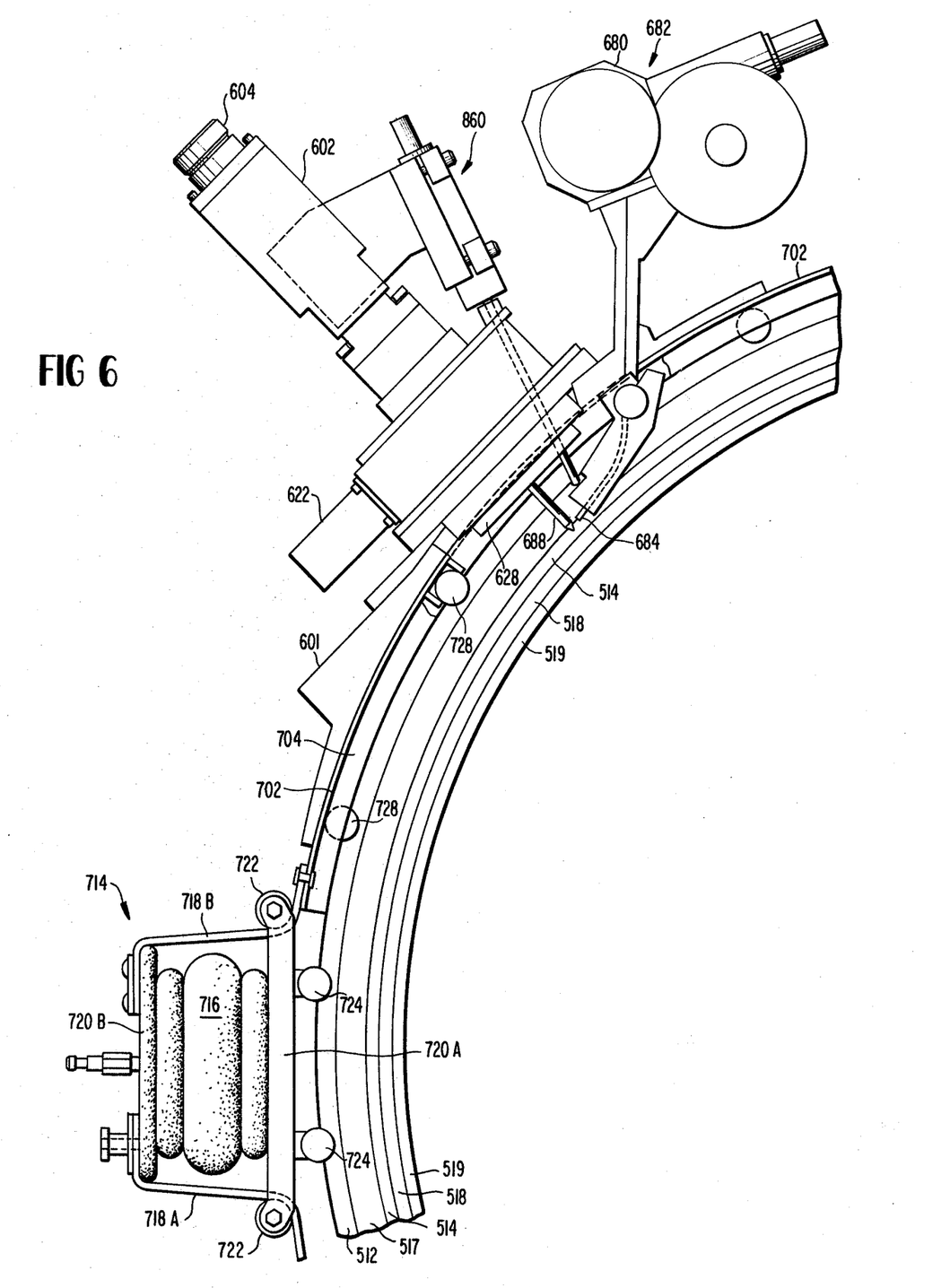
FIG. 6 is a detailed view of the welding assembly mounted on the outer carriage band.

The welding control of this invention includes feedback means, generally denoted 860, by which the electrode-to-weld or arc gap distance of torch 604 is referenced to a predetermined reference surface on weld joint 500. Referring specifically to FIGS. 5-7, feedback means 860 comprises the reference groove defined by lands 514, a position transducer or sensor 870, and means by which transducer 870 is coupled to torch 604 and the reference groove such that transducer 870 provides an output signal which is proportional to the relative distance therebetween. Advantageously, position transducer 870 comprises a linear, variable differential transformer (LVDT) which has an outer body 874 and an internal core member 876 which is axially displaceable with respect to outer body 874. The coupling means comprises a bracket 878, which extends through slots (not shown) in actuator superstructure 616, by which outer body 874 is fixedly mounted to torch sleeve 610 at a predetermined location thereon which is known distance from torch electrode tip 608A, as shown, and a rod member 880, which is slidably mounted within actuator 606, by which core member 876 is mechanically linked to at least one of the joint surfaces 514 defining the reference groove. As is well known, transducer 870 provides an output signal which is indicative of the relative positions of outer body 874 and internal core member 876 with respect to each other. Since the positions of outer body 874 and member 876 have a predetermined relationship with respect to the position of torch electrode tip 608A and the reference groove, respectively, the output position transducer 870 is also indicative of the distance between electrode tip 608A and the reference groove.

The coupling means may further comprise a wire feed guide arm 882 which is pivotably mounted on weld module mounting plate 601 such that arm 882 is oriented transversely to the longitudinal axis of pipe sections 12 and 14, and distal end portion 884 of arm 882 rides on reference lands 514. Guide arm 882 advantageously may be provided with a longitudinal passageway 886 therethrough, such that the filler metal wire 684 is delivered to the weld zone adjacent torch electrode tip 608A. Since guide arm 882 rides on lands 514, wire 684 is maintained in proper alignment with respect to torch electrode 608 at all times. The distal end 880A of rod member 880 rides on a portion 888 of the upper surface 890 of guide arm 882 which is known distance from the reference groove, such that position transducer 870 is mechanically linked to at least one of the reference surfaces 514 defining groove and the output thereof is proportional to the distance between torch electrode tip 608A and the reference groove, as described hereinabove.

In operation, a reference signal is obtained from feedback means 870 which is used by the associated local programmer to limit the maximum displacement of torch electrode 808 toward weld joint 500. The reference signal is obtained, as will be described hereinbelow by actuating actuator 606 until torch electrode tip 608A just torches the surface 515 defining the weld zone surface and storing the corresponding output of transducer 870. Thus, although the actual welding techniques used may be conventional, i.e., the welding parameters for each torch 604 as it travels around weld joint 500 are controlled by controlling the weld current, torch travel speed, the rate at which wire 684 is fed, and the arc gap distance of torch electrode 608, the welding system of the present invention relies on reference to a machined surface (lands 514), rather than the unstable weld puddle surface that is beneath the arc, to control the arc length. As a consequence, the appearance of a hole in the weld puddle beneath the arc does not result in the torch electrode being driven into the weld joint, as may happen in conventional systems.

Having described the apparatus employed in the welding operation of the present invention, a normal welding operation will now be described. After the corresponding ends of pipe sections 12 and 14, respectively, have been end-prepped with the bevel as described hereinabove, clamping assembly 200 is positioned within pipe sections 12 and 14, and pipe sections 12 and 14 are aligned, joined up, and rounded as described hereinabove. Back-up band 320 is then cammed into its fully expanded position beneath joint 500, as described hereinabove, and an inert gas is introduced into expansion chamber 375, if necessary, to prevent oxidation of the weld material.

Carriage assembly 700, with welding modules 600 attached, is next positioned around pipe sections 12 and 14 in relative alignment with weld joint 500, as described hereinabove, and carriage band 702 is closed and tensioned by means of bellows assembly 716. The drive assembly is positioned around one of the pipe sections 12 or 14 in relative alignment with carriage band 702. The tractor assembly drive yoke is connected to the adjacent welding module 600, and welding chamber 708 is pressurized.

Welding modules 600 are initialized by actuating the arc gap control actuators 606 until torch electrode tips 608A contact weld zone surface 515 of joint 500, and measuring the absolute voltages being generated by the associated position transducers 870, which are used as reference voltages.

With welding modules 600 initialized, the welding cycle is commenced by introducing shielding gas via gas lens 612 and port 524 to the weld zone of each module 600, and by actuating each torch 604 and wire feed module 680. Carriage assembly 700 is rotated approximately 180°, in a clockwise direction (such that the wire feed modules 680 lead in the torch modules 604), plus the overlap distance for tie-in of the starts and stops of each individual weld, around weld joint 500, such that each welding module 600 traverses one half of the circumference of the joint 500. As should be obvious, since all of the weld modules 600 are connected to carriage band 702, all of the modules 600 travel in the same direction, and thus, with equidistantly-spaced modules, that two of the modules will be traveling uphill and two will be traveling downhill at any one instant in time during the welding operation. As discussed hereinabove, the pressure exerted by the pressurized air in welding chamber 708 on the gas shields surrounding each weld zone causes a puddle-pushing effect, which not only compensates for the effects of gravity, but also allows uniform reinforcement of weld joint 500 within the interior of pipe sections 12 and 14. Approximately 90° of the travel around joint 500 for each weld module 600 constitutes the root pass for that module, and the remaining approximately 90° of travel constitutes the hot, or first fill pass for that portion of the weld was the root pass for the preceding torch. The control cams for each weld module 600 are programmed to cause an increase in torch electrode height and the required changes in weld current and wire feed rate to allow the root pass portion of the weld cycle for each module 600 to smoothly transition into the fill pass portion.

When the 180° of travel by welding system 400 has been completed, the controller 800 causes the drive tractor to stop, and welding modules 600 to be deactivated. The tractor drive yoke is decoupled from the welding module 600 to which it is connected, carriage band 702 is loosened and carriage assembly 700 (and the drive assembly is removed from weld joint 500 and moved to the next station. Finally, clamps 220, 240, and 250 are retracted and clamping assembly 200 is transported through the now welded pipe sections 12 and 14 to the next welding station, where the welding procedure just described is repeated.

Although the present invention has been described relative to exemplary embodiments thereof, it will be understood by those skilled in the art that variations and modifications can be effected in these embodiments without departing from the scope and spirit of the invention.

We claim:

1. An automatic pipe joint welding method, comprising the steps of:
    placing one end portion of a pipe length provided with a machined reference surface thereon in facing relationship with one end of a second pipe length to define a weld zone therebetween, including said at least one reference surface;
    mounting four rotatable welding heads spaced 90° from each other around the circumference of said pipes over said weld zone;
    rotating said welding heads around the circumference of said pipes through an arc of about 180° to weld said facing ends to each other and so that the arc of travel of one of said heads at least significantly overlaps the arc of travel of an immediately preceeding one of said heads;
    sensing the position of said welding head relative to said reference surface; and
    adjusting said welding head relative to said weld zone depending on the sensed position of the welding head to maintain said welding head in substantially optimum relationship to said weld zone.

2. A method according to claim 1, further comprising:
    simultaneously welding a plurality of circumferential sections of said facing pipe ends to complete a 360° weld in one pass.

3. A method according to claim 2, further comprising:
    rotating said plurality of welding heads through an arc of less than 360° to complete said 360° weld in one pass.

4. The method according to claim 1, further comprising:
    adjusting said plurality of welding heads as a function of the second position of the heads relative to said reference surface to effect a radial movement of said heads to thereby adjust the distance of said head from the weld joint formed by the facing ends of said pipe lengths.

5. A method for use in automatic pipe welding systems, comprising the steps of:
    arranging a pair of pipe lengths to lie end to end to define a weld zone therebetween;
    arranging a welding apparatus, including a welding chamber and a welding torch having a welding electrode which extends into the welding chamber, around said pipes over said weld zone;
    establishing an inert gas shield around said electrode in the area of said weld zone;
    supplying a pressurized fluid to said weld chamber;
    transmitting the force of said pressurized fluid to and through said gas shield to the weld zone to produce a puddle pushing effect on weld material heated by said electrode to displace said weld material toward the interior of said pipes; and preventing transmission of said pressurized fluid itself through the gas shield to thereby prevent contamination of the weld zone by said pressurized fluid.

6. The method according to claim 5, further comprising:
supplying an auxiliary flow of inert gas around the torch electrode to augment the gas shield and thereby prevent a constriction of the gas shield which would expose the weld zone to contamination by said pressurizing fluid as a consequence of said pressure being exerted on the gas shield.

7. The method according to claim 6, further comprising:
creating a barrier curtain around the gas shield such that the gas shield is pressurized at a pressure relatively greater than the pressure within the remainder of the welding chamber; and
creating a gas flow from the gas shield, through the air curtain and into the remainder of the welding chamber, to prevent mixing of the pressurizing fluid and the gas shield in the weld zone.

8. The method according to claim 5, further comprising:
preparing an end portion of at least one of said pipe lengths to provide a machined reference surface thereon;
sensing the position of said welding torch relative to said reference surface; and
adjusting said welding torch relative to said weld zone depending on the sensed position of the welding torch to maintain the torch in substantially optimum relationship to the weld zone.

9. The method according to claim 8, further comprising:
adjusting said welding torch as a function of the sensed position of the torch relative to the reference surface to effect radial movement of the torch to thereby adjust the distance of the torch from the weld joint formed by the facing ends of the pipe lengths.

10. The method according to claim 5, further comprising:
mounting a plurality of welding torches around said pipes over said weld zone; and
rotating said plurality of torches around the circumference of said pipes so that the arc of travel of one head is at least partially overlapped by the arc of travel of a next adjacent head.

11. The method according to claim 10, further comprising:
mounting four welding torches spaced 90° from each other around the circumference of said pipes over said weld zone; and
rotating said torches through an arc of at least 90°.

12. Apparatus for use in an automatic welding system, in which a pair of pipe lengths are arranged to lie end to end to form a pipe point, at least one of the facing ends of said pipe lengths being prepared to provide a reference surface thereon, such that the facing ends of said pipe lengths define a weld zone;
and wherein the welding system rotates around the exterior circumference of the pipe joint at the weld zone, said apparatus comprising:
welding means, including four welding torches mounted 90° apart for circumferential movement around said pipe lengths adjacent said weld zone and a wire feed means having a wire feed guide means which cooperates with said reference surface;
means for moving said torches through an arc of about 180° around the circumference of said pipe joint, the depth of weld material produced during movement of said welding means through said arc of about 180° around the circumference of said pipe joint being no greater than the radial distance between said pipe joint and said reference surface; and
sensing and control means coupled to said welding means through said wire feed guide means for sensing said reference surface and continuously controlling said welding means relative to said welding zone as said welding means moves around said pipe lengths to maintain said welding torch in substantially optimum relationship to said weld zone.

13. Apparatus according to claim 12, wherein said welding means comprises means for simultaneously welding a plurality of circumferential sections of said facing pipe ends to complete a 360° weld in one pass.

14. Apparatus according to claim 13, wherein said 360° weld is completed upon movement of said welding means through less than 360° around the circumference of said facing pipe ends.

15. Apparatus according to claim 12, further comprising:
guide means cooperating with said welding means and a second reference surface provided on said at least one facing end for guiding said welding torches circumferentially around said pipe lengths and maintaining said torches within said weld zone.

16. Apparatus according to claim 15, wherein:
said guide means comprises rollers coupled to said welding means and making rolling contact with said second reference surface.

17. Apparatus according to claim 12, wherein said sensing and control means are mechanically linked between said welding means and said reference surface.

18. Apparatus according to claim 17, wherein said sensing and control means are fixed to said welding torches for movement therewith.

19. Apparatus according to claim 18, wherein said sensing and control means controls movements of said welding torches relative to the portions of the facing ends of said pipe lengths to be welded together.

20. Apparatus according to claim 19, wherein said sensing and control means includes a linear variable differential transformer.

21. Apparatus for use in an automatic pipe welding system, in which a pair of pipe lengths are arranged to lie end to end to define a joint to be welded and wherein the welding system circumferentially traverses the pipe joint to be welded, comprising:
means defining a welding chamber around said joint;
at least one welding torch mounted for circumferential movement relative to said pipe lengths, said torch having a welding electrode extending into said welding chamber for heating a weld zone to form a weld puddle at said joint;
means for introducing a flow of inert gas around the electrode to provide a gas shield in the region of the weld zone adjacent said electrode; and
means for pressurizing said welding chamber with a fluid so as to exert a force on the gas shield, said force being transmitted by the gas shield to the weld zone to cause a puddle-pushing effect on the weld puddle which tends to displace weld material toward the interior of said pipe joint.

22. The apparatus according to claim 21, further comprising:
means for introducing an auxiliary flow of inert gas around said electrode to augment said gas shield to prevent contamination of the weld zone by said pressurizing fluid as a consequence of said force being exerted on said shield.

23. The apparatus according to claim 22, wherein said gas shield and said auxiliary flow constitute first and second concentric shields around said electrode.

24. The apparatus according to claim 21, further comprising:
means for creating a barrier curtain within said welding chamber around the gas shield such that the gas shield is maintained at a pressure relatively greater than the pressure within the remainder of said welding chamber, said barrier curtain means defining a flow path outwardly from said gas shield, through said barrier curtain, and into the remainder of said welding chamber to prevent mixing of said pressurizing fluid and said gas shield to thereby prevent contamination of the weld zone by said pressurizing fluid.

25. The apparatus according to claim 24, wherein said pressurizing fluid primarily constitutes air.

26. The apparatus according to claim 24, wherein said means for creating a barrier curtain comprises a seal member surrounding the weld zone and extending between said welding chamber means and said facing pipe joint ends such that a restricted passageway, permitting said gas flow, is defined between said seal member and said facing ends.

27. The apparatus according to claim 21, further comprising:
means for moving said welding chamber with said torch circumferentially around the exterior surface of said pipes.

28. The apparatus according to claim 27, wherein said means defining said welding chamber includes means for creating an air cushion effect between at least a portion of said welding chamber and said pipe ends as a result of a flow of said pressurizing fluid outwardly from said welding chamber to thereby facilitate movement of said welding chamber and said torch around said pipes.

29. The apparatus according to claim 28, further comprising guide means coupled to said welding chamber and engageable with at least one of said facing pipe ends to guide said welding chamber and said torch during movement thereof around said pipes.

30. Apparatus according to claim 29, wherein said guide means operates to maintain said torch in alignment with said weld zone.

31. Apparatus according to claim 21, further comprising:
sensing and control means coupled to said welding torch for sensing a reference surface provided on at least one of said facing pipe length ends and for controlling said welding torch relative to said weld zone to maintain said torch in substantially optimum relationship to said weld zone.

32. Apparatus according to claim 31, further comprising:
four welding torches spaced 90° apart around the circumference of said pipe joint and means for moving said torches through an arc of at least 180° around the circumference of said pipe joint, the depth of weld material produced during movement of said welding torches through said arc of at least 180° around the circumference of said pipe joint being no greater than the radial distance between said pipe joint and said reference surface.

33. Apparatus according to claim 31, further comprising four welding torches mounted approximately 90° apart around the circumference of the pipe joint.

34. Apparatus according to claim 33, further comprising means for moving said welding torches through an arc of at least 90° around said pipe joint.

35. Apparatus according to claim 31, wherein said reference surface is located radially outwardly of the joint to be welded a distance greater than the depth of weld material produced during at least one circumferential pass of said weld zone by said welding torch.

36. Apparatus according to claim 21, wherein said welding chamber comprises an elongated band of flexible material.

37. Apparatus according to claim 36, further comprising:
means releasably connecting the ends of said flexible band for mounting said band around said pipes.

38. Apparatus according to claim 36, further comprising:
means coupled to said band for tensioning said band around said pipes.

39. Apparatus according to claim 38, wherein said tensioning means comprises a bellows.

40. Apparatus according to claim 36, further comprising:
peripheral flexible seal members mounted on and depending from at least a portion of the periphery of said elongated band, said seal members and the exterior surface of said pipes defining a passageway through which said pressurizing fluid flows to create an air cushion effect between said band and said pipes.

41. Apparatus according to claim 21, further comprising back-up band means engageable with the interior surfaces of said facing pipe ends to define a chamber for receiving weld material displaced inwardly by said puddle pushing effect.

42. Apparatus according to claim 41, wherein said back-up band means comprises a radially expandable and contractable band having a sufficient axial dimension to simultaneously contact interior surface portions of the facing ends of both said pipe lengths and having a circumferential recess formed therein which defines a space for receiving said inwardly displaced weld material.

43. In an automatic welding system, in which a pair of pipe lengths are arranged end to end with at least one reference surface being provided on at least one of the facing ends of said pipe lengths, said reference surface defining an arc gap control guide, and welding means, including a welding torch, overlies, the facing ends of said pipes, said welding means being rotatable around the circumference of said pipes to weld said facing ends, the improvement comprising:
means for engaging the interior surface portions of said facing pipe length ends for defining a mold to receive weld material flowing inwardly from a weld produced by said welding means, comprising a radially expandable and contractable band having a sufficient axial dimension to simultaneously contract interior surface portions of the facing ends of both said pipe lengths, said band having a circumferential recess formed therein which defines a space for receiving said inwardly flowing weld material;

means for defining a welding chamber overlying said pipe ends;

at least one welding torch mounted for circumferential movement relative to said pipe lengths, said torch having a welding electrode extending into said welding chamber for heating a weld zone to form a weld puddle;

means for introducing a flow of inert gas around the electrode to provide a gas shield in the region of the weld zone adjacent said electrode; and means for pressurizing said weld chamber with a fluid so as to exert a force on the gas shield, said force being transmitted by the gas shield to the weld zone to cause a puddle-pushing effect on the weld puddle which tends to displace weld material toward the interior of said facing pipe ends.

44. The apparatus according to claim 43, further comprising:

means for introducing an auxiliary flow of inert gas around said electrode to augment said gas shield to prevent contamination of the weld zone by said pressurizing fluid as a consequence of said force being exerted on said shield.

45. The apparatus according to claim 43, further comprising:

means for moving said welding chamber with said torch circumferentially around the exterior surface of said pipes.

46. The apparatus according to claim 45, wherein said means defining said welding chamber includes means for creating an air cushion effect between at least a portion of said welding chamber and said pipe ends as a result of a flow of said pressurizing fluid outwardly from said welding chamber to thereby facilitate movement of said welding chamber and said torch around said pipes.

47. The apparatus according to claim 46, further comprising guide means coupled to said welding chamber and engageable with at least one of said facing pipe ends to guide said welding chamber and said torch during movement thereof around said pipes.

48. Apparatus according to claim 47, wherein said guide means operates to maintain said torch in alignment with said weld zone.

49. Apparatus according to claim 43, further comprising:

sensing and control means coupled to said welding means for sensing said arc gap control guide and controlling said welding means relative to a weld zone including at least portions of said facing pipe length ends to maintain said welding means in substantially optimum relationship to said weld zone.

50. Apparatus according to claim 49, wherein said welding means includes a plurality of welding torches coupled to each other for circumferential movement around said pipes adjacent said weld zone.

51. Apparatus according to claim 49, wherein said welding means comprises four welding torches mounted approximately 90° apart around the circumference of said pipes.

52. Apparatus according to claim 51, wherein said welding means further comprises means for moving said welding torches through an arc of at least 90° around said weld zone.

* * * * *